US009280023B2

United States Patent
Sato

(10) Patent No.: US 9,280,023 B2
(45) Date of Patent: Mar. 8, 2016

(54) LIQUID CRYSTAL DISPLAY DEVICE

(71) Applicants: Japan Display Inc., Tokyo (JP); Panasonic Liquid Crystal Display Co., Ltd., Himeji-shi (JP)

(72) Inventor: Takao Sato, Funabashi (JP)

(73) Assignees: JAPAN DISPLAY INC., Tokyo (JP); Panasonic Liquid Crystal Display Co., Ltd., Hyogo-Ken (JP)

(*) Notice: Subject to any disclaimer, the term of this patent is extended or adjusted under 35 U.S.C. 154(b) by 107 days.

(21) Appl. No.: 14/169,165

(22) Filed: Jan. 31, 2014

(65) Prior Publication Data
US 2014/0146258 A1 May 29, 2014

Related U.S. Application Data

(63) Continuation of application No. 13/242,371, filed on Sep. 23, 2011, now Pat. No. 8,670,080.

(30) Foreign Application Priority Data

Sep. 29, 2010 (JP) ................................. 2010-218351

(51) Int. Cl.
*G02F 1/1343* (2006.01)
*G02F 1/1362* (2006.01)

(52) U.S. Cl.
CPC .... *G02F 1/134363* (2013.01); *G02F 1/136286* (2013.01); *G02F 2201/40* (2013.01)

(58) Field of Classification Search
CPC ..................... G02F 1/136286; G02F 1/134363; G02F 2201/40
See application file for complete search history.

(56) References Cited

U.S. PATENT DOCUMENTS

| 7,999,777 | B2 | 8/2011 | Morimoto et al. |
| 8,169,568 | B2 | 5/2012 | Kim |
| 8,184,224 | B2 | 5/2012 | Asano et al. |
| 8,253,911 | B2 | 8/2012 | Kimura |
| 8,259,269 | B2 | 9/2012 | Itou et al. |
| 2007/0126965 | A1 | 6/2007 | Huang et al. |
| 2009/0059147 | A1 | 3/2009 | Igeta et al. |
| 2009/0102997 | A1 | 4/2009 | Wen et al. |
| 2010/0051935 | A1 | 3/2010 | Lee et al. |
| 2010/0245223 | A1* | 9/2010 | Asako et al. ................. 345/92 |
| 2010/0302471 | A1* | 12/2010 | Kim et al. ..................... 349/37 |

FOREIGN PATENT DOCUMENTS

JP          6-289423          10/1994

* cited by examiner

*Primary Examiner* — Paisley L Arendt
*Assistant Examiner* — Edmond Lau
(74) *Attorney, Agent, or Firm* — Hauptman Ham, LLP

(57) ABSTRACT

The drain lines are such that one drain line is formed for every two pixels adjacent to each other within the same pixel row, the gate lines are formed of a first gate line connected to one of the two pixels connected to the same drain line within the same pixel row and a second gate line connected to the other pixel, the pixel electrode is formed of a first linear electrode inclined in a plus direction from the first direction, and a second linear electrode inclined in a minus direction from the first direction, in a region in which the pixel electrode is superimposed over the common electrode, and each pixel has the first and second gate lines and thin film transistor formed in a region between the region of the first linear electrode and the region of the second linear electrode.

5 Claims, 7 Drawing Sheets

LIQUID CRYSTAL DISPLAY DEVICE

CROSS-REFERENCE TO RELATED APPLICATION

This application is a continuation of U.S. application Ser. No. 13/242,371, filed Sep. 23, 2011, and which application claims priority from Japanese application JP 2010-218351 filed on Sep. 29, 2010, the content of which is hereby incorporated by reference into this application.

BACKGROUND OF THE INVENTION

1. Field of the Invention

The present invention relates to a liquid crystal display device, and in particular, relates to a liquid crystal display device including linear (comb-like) electrodes with differing inclination angles within the same pixel.

2. Description of the Related Art

A liquid crystal display device called an in-plane switching (IPS) type or lateral electric field type is configured so that a pixel electrode and common electrode disposed opposed to each other across an insulating film are formed on the same planar substrate. The IPS type liquid crystal display device is configured so that an electric field having components parallel to the principal surface of the planar substrate is generated between the pixel electrode and common electrode, and liquid crystal molecules are driven by the electric field, and is known for enabling a wide viewing angle display. With the IPS type liquid crystal display device, a transparent electrode in which a plurality of slits are formed is formed across an insulating film on the liquid crystal side of a planar common electrode formed by a transparent conductive film, and this configuration allows a formation of a linear (comb-like) pixel electrode superimposed over the planar common electrode.

In recent years, a further improvement in display quality has been demanded, and an improvement in aperture ratio has been demanded in order to improve a dynamic range range. As a liquid crystal display device with an improved aperture ratio, for example, a configuration is such that one drain line is formed for every two pixel columns disposed adjacent to each other, and video signals are supplied, time-shared, to pixels disposed on either side of the drain line. Furthermore, there is a liquid crystal display device in which pixels are formed so as to be displaced by half a pitch in an extension direction of a gate line (an extension direction of a drain line) every other row (column), thereby reducing defective displays accompanying an occurrence of so-called vertical streaks caused when video signals are supplied time-shared. As a liquid crystal display device in which pixels are disposed displaced by half a pitch in the extension direction of the gate line every other row (column), there is, for example, a liquid crystal display device described in JP 6-289423 A.

Meanwhile, as a technology of improving the viewing angle of the IPS type liquid crystal display device, there is a so-called multi-domain type wherein the inclination angles of slits SLT opened along a gate line GL are formed with inclination angles differing in a region close to and a region far from a thin film transistor TFT within a rectangular pixel region, as shown in FIG. 8. However, when the slits SLT opened in the direction of the gate line GL are formed, it is necessary to form a pixel electrode having the slits SLT to be large in the extension direction of the slits in order to improve the aperture ratio. However, when the gap between pixel electrodes of adjacent pixels becomes smaller, the effect of a diving voltage between adjacent pixels becomes higher, and there is fear that a difference in effective voltage occurs between the adjacent pixels, causing vertical streaks.

As a method of solving this problem, there is a multi-domain method whereby slits are formed in a direction perpendicular to a gate line (a direction of pixel columns) with inclination angles differing in a region close to and a region far from a thin film transistor within a pixel region, and the slits with the differing inclination angles are linked, forming a linear electrode PX in a dogleg form, as shown in FIG. 9.

However, with this type of pixel electrode PX, it is known that it is possible to increase a gap L between pixel electrodes, but that, an electric field being disturbed in a boundary region, shown by the dotted-line circle, in which the inclination angle of the slits changes, it is not possible to carry out a normal image display, and in particular, an occurrence of a so-called push domain is known wherein back light is transmitted by pressing a liquid crystal display device from the normal direction thereof. As an improvement method thereof, as shown in FIG. 10, a method is known whereby slits SLT with inclination angles differing in a region close to and a region far from a thin film transistor within a pixel region are formed, and an electrode TT is formed in a boundary region, but the region in which the electrode TT is formed is a region which does not contribute to an image display, meaning that there is fear that the aperture ratio decreases.

SUMMARY OF THE INVENTION

The invention has been contrived bearing in mind these problems, and an object of the invention lies in providing a technology whereby it is possible to improve the aperture ratio of an IPS type liquid crystal display device.

In order to achieve the object, a liquid crystal display device includes drain lines extended in a first direction and arranged in parallel in a second direction; gate lines extended in the second direction and arranged in parallel in the first direction; a common electrode, formed to be planar, into which a common signal which is a reference is input; a linear pixel electrode disposed on a liquid crystal layer side across an insulating film and disposed superimposed over the common electrode; and a thin film transistor which supplies a video signal from the drain lines to the pixel electrode in synchronism with a scan signal from the gate lines, wherein the drain lines are such that one drain line is formed for every two pixels adjacent to each other within the same pixel row, the gate lines are formed of a first gate line connected to one of the two pixels connected to the same drain line within the same pixel row and a second gate line connected to the other pixel, the pixel electrode is formed of a first linear electrode inclined in a plus direction from the first direction, and a second linear electrode inclined in a minus direction from the first direction, in a region in which the pixel electrode is superimposed over the common electrode, and each pixel has the first and second gate lines and thin film transistor formed in a region between the region of the first linear electrode and the region of the second linear electrode.

According to the invention, it is possible to further improve the aperture ratio of the IPS type liquid crystal display device.

Other advantages of the invention will be demonstrated from the description of the whole specification.

DETAILED DESCRIPTION OF THE INVENTION

Figure 1:
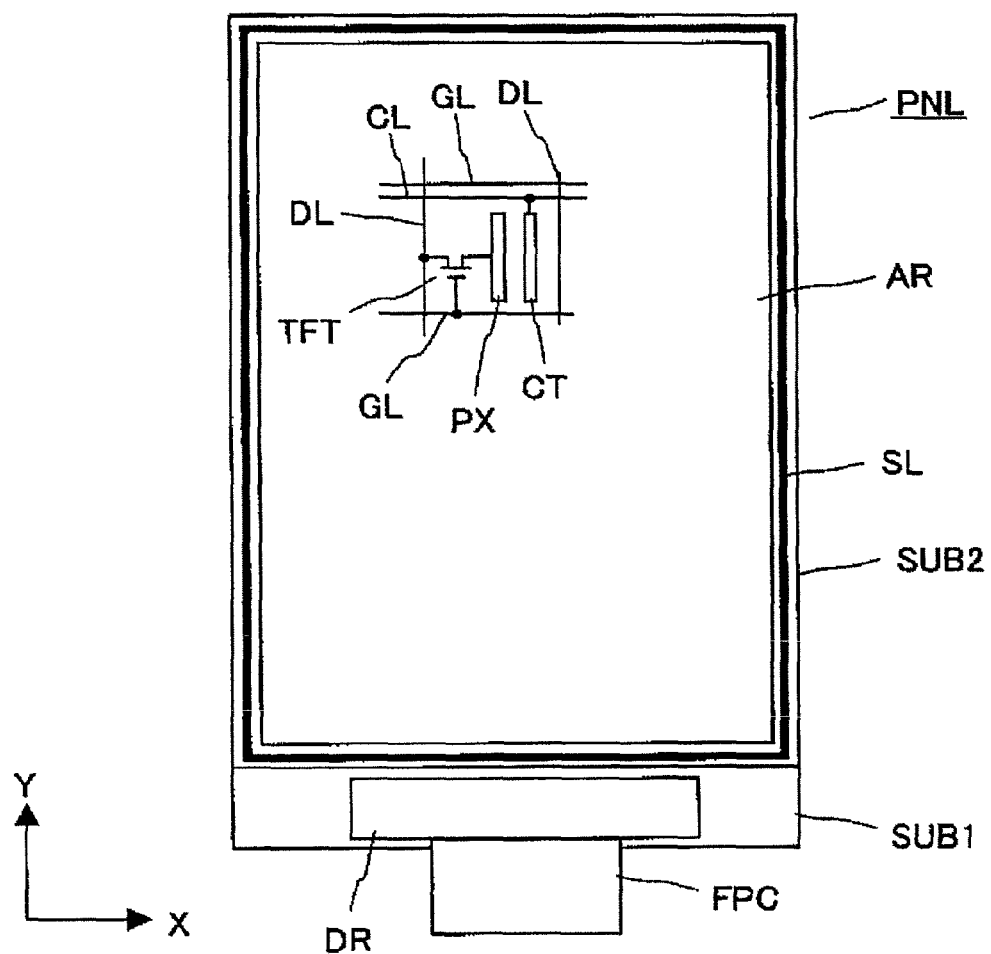
FIG. 1 is a diagram for illustrating an outline configuration of a liquid crystal display device which is a display device of Embodiment 1 of the invention.

Hereafter, a description will be given, using the drawings, of embodiments to which the invention is applied. However, in the following description, the same components will be given the same reference characters and numerals, and a redundant description will be omitted.

[Embodiment 1]
[Overall Configuration]

FIG. 1 is a diagram for illustrating an outline configuration of a liquid crystal display device which is a display device of Embodiment 1 of the invention and, hereafter, a description will be given, based on FIG. 1, of an overall configuration of the liquid crystal display device of Embodiment 1. However, X and Y shown in FIG. 1 indicate an X axis and a Y axis respectively. Also, in the following description, a case in which a linear pixel electrode is disposed on a liquid crystal layer side of a planar common electrode across an insulating film will be described, but the invention, not being limited to this, can also be applied to, for example, an IPS type liquid crystal display device in which drain lines and a planar pixel electrode are formed on the same layer, and a linear common electrode is disposed on a liquid crystal layer side of the pixel electrode across an insulating film.

As shown in FIG. 1, the liquid crystal display device of Embodiment 1 has a liquid crystal display panel PNL configured of a first substrate SUB1 on which a pixel electrode (a second electrode) PX and thin film transistor TFT are formed, a second substrate SUB2, disposed opposed to the first substrate SUB1, on which a color filter or the like is formed, and an unshown liquid crystal layer sandwiched between the first substrate SUB1 and second substrate SUB2, and the liquid crystal display device is configured by combining the liquid crystal display panel PNL and an unshown back light unit (back light device) which is a light source of the liquid crystal display panel PNL. In order to fix the first substrate SUB1 to the second substrate SUB2 and seal a liquid crystal, a configuration is such that the first substrate SUB1 and second substrate SUB2 are fixed by a seal material SL annularly applied to the perimeter of the second substrate, and the liquid crystal is also thus sealed. However, in the liquid crystal display device of Embodiment 1, a region in which display pixels (hereafter abbreviated to pixels) are formed within a region in which the liquid crystal is enclosed is a display region AR. Consequently, a region, uninvolved in a display, in which no pixel is formed, even though it is in the region in which the liquid crystal is enclosed, is not the display region AR.

Also, the second substrate SUB2 has a smaller area than the first substrate SUB1, thus exposing a lower edge portion of the first substrate SUB1 seen in the drawing. A drive circuit DR configured of a semiconductor chip is mounted on the edge portion of the first substrate SUB1. The drive circuit DR drives each pixel disposed in the display region AR. In the following description, when the liquid crystal display panel PNL is described too, it may be described as the liquid crystal display device.

It is common that, for example, a well-known glass substrate is used as the base material of the first substrate SUB1 and second substrate SUB2, but the base material, not being limited to a glass substrate, may be another insulating substrate such as one made of silica glass or plastic (a resin).

In the liquid crystal display device of Embodiment 1, scan signal lines (gate lines) GL, extended in an X direction and arranged in parallel in a Y direction, as seen in FIG. 1, to which is supplied a scan signal from the drive circuit DR are formed in the display region AR on a liquid crystal side surface of the first substrate SUB1. Also, video signal lines (drain lines) DL, extended in the Y direction and arranged in parallel in the X direction, as seen in FIG. 1, to which is supplied a video signal (a gradation signal) from the drive circuit are formed. At this time, with the liquid crystal display device of Embodiment 1, as will be described in detail hereafter, a configuration is such that the drain lines DL are arranged in parallel in the Y direction, one for every two pixels adjacent to each other in the X direction, and a configuration is such that two pixels on the same pixel row (scan line) are connected to the one drain line DL. Also, a configuration is such that video signals corresponding to two adjacent pixels are sequentially input for each scan line. Also, a configuration is such that two linear gate lines extended in the X direction are formed in a Y direction intermediate region of the pixel electrode, and pixels to which the same drain line is connected are connected one to each differing gate line.

Each pixel, for example, as shown in the equivalent circuit schematic of FIG. 1, includes the thin film transistor TFT on/off driven by scan signals from the gate lines GL, the pixel electrode PX supplied with video signals from the drain lines DL via the turned-on thin film transistor TFT, and the common electrode CT supplied, via a common line CL, with a common signal having a potential which is a reference for the potential of the video signals. However, the thin film transistor TFT, being a thin film transistor of a so-called inversely staggered structure, is driven so that a drain electrode and source electrode interchange by the thin film transistor being biased, but in the present specification, for the sake of simplicity, the electrode connected to the drain lines DL will be described as a drain electrode DT, and the electrode connected to the pixel electrode PX as a source electrode ST.

An electric field having components parallel to the principal surface of the first substrate SUB1 is generated between the pixel electrode PX and common electrode CT, and liquid crystal molecules are driven by the electric field. This kind of liquid crystal display device is known for enabling a so-called wide viewing angle display, and called an IPS type or horizontal electric field type from the specificity of electric field application to the liquid crystal. Also, with the liquid crystal display device with this kind of configuration, a display is carried out in a normally black display form wherein the optical transmittance is minimized (a black display) when no electric field is applied to the liquid crystal, and the optical transmittance is improved by an electric field being applied.

Each drain line DL and each gate line GL is extended beyond the seal material SL in its edge portion, and connected to the drive circuit DR which generates drive signals, such as a video signal and a scan signal, based on an input signal input from an external system via a flexible printed circuit board FPC. Note that, with the liquid crystal display device of Embodiment 1, a configuration is such that the drive circuit DR is formed by a semiconductor chip and mounted on the first substrate SUB1, but a configuration may be such that one or both of a video signal drive circuit, which outputs a video signal, and a scan signal drive circuit, which outputs a scan signal, are mounted on the flexible printed circuit board FPC by a tape carrier method or a chip on film (COF) method, and connected to the first substrate SUB1.

With the liquid crystal display device of Embodiment 1, a configuration is such that a common signal is input, via the common line CL, into the common electrode CT formed independently for each pixel but, not being limited to this, for example, a configuration maybe such that the common electrode CT is formed all over at least the display region AR.

[Pixel Configuration]

Figure 2:
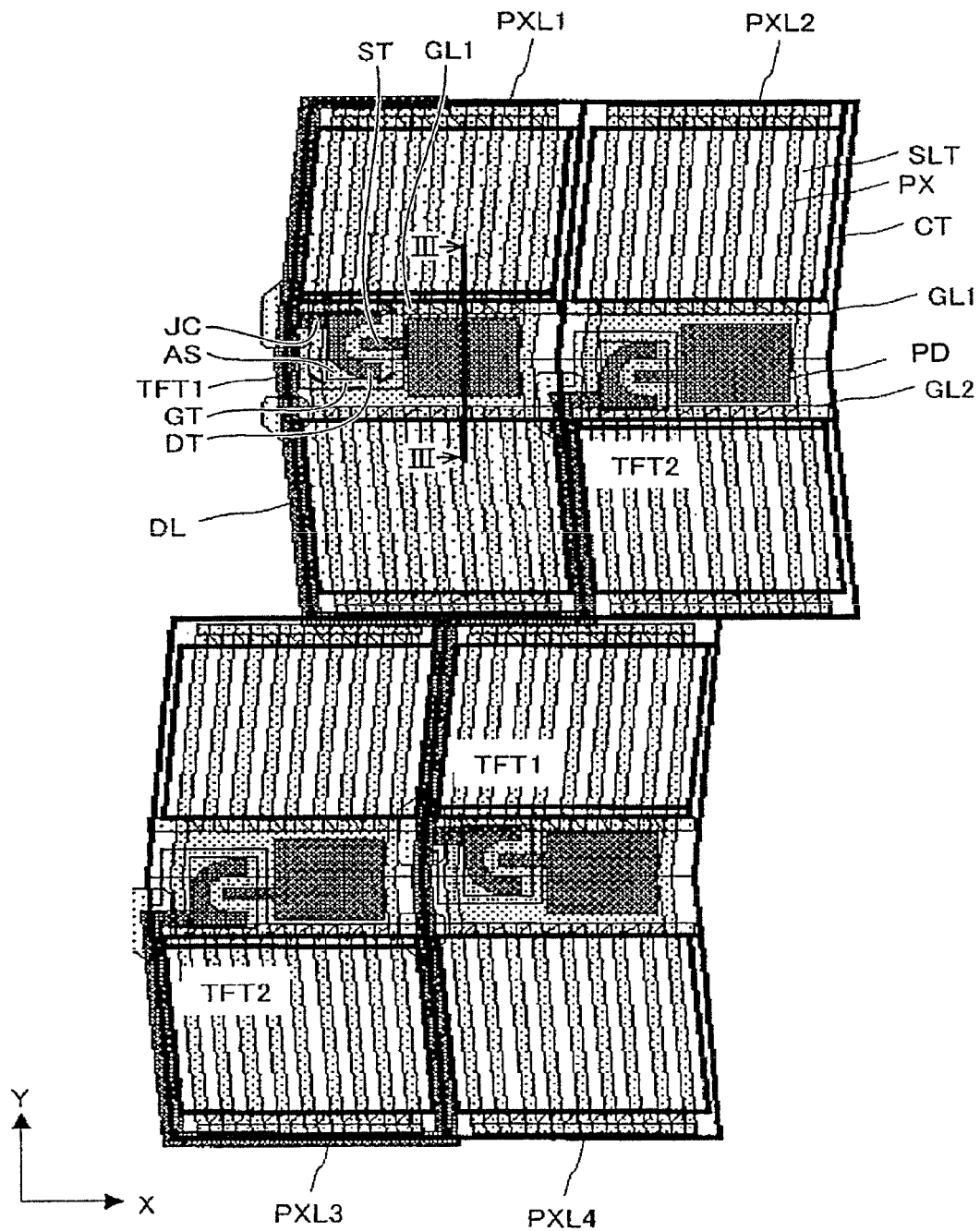
FIG. 2 is a plan view for illustrating a pixel configuration in the liquid crystal display device of Embodiment 1 of the invention.
Figure 3:
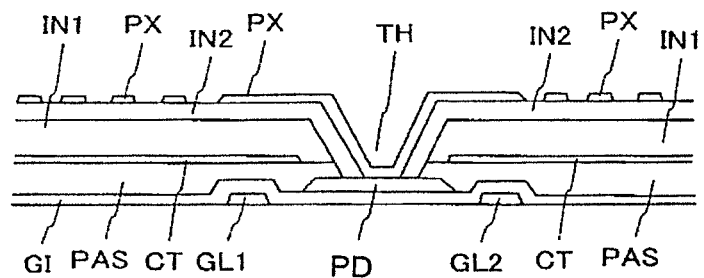
FIG. 3 is a sectional view taken along line III-III of FIG. 2.
Figure 4:
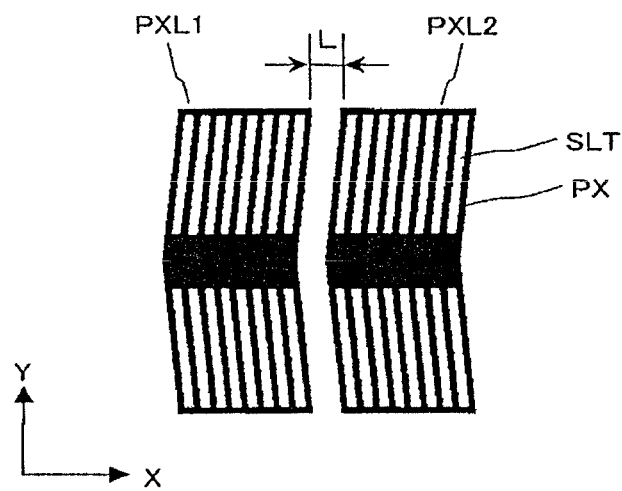
FIG. 4 is a diagram for illustrating an outline configuration of a pixel electrode of Embodiment 1 of the invention.

FIG. 2 is a plan view for illustrating a pixel configuration in the liquid crystal display device of Embodiment 1 of the invention, and in particular, a plan view of the first substrate SUB1. Also, FIG. 3 is a sectional view taken along line III-III of FIG. 2, and FIG. 4 is a diagram for illustrating an outline configuration of the pixel electrode of Embodiment 1 of the invention. However, the pixel disposition shown in FIG. 2 illustrates a case in which the upper level is an odd-numbered scan line row, while the lower level is an even-numbered scan line row, and the left column of each level is an odd-numbered column, while the right column is an even-numbered column. Also, in the following description, as each thin film layer can be formed by a well-known photolithographic technique, details of a formation method thereof or the like will be omitted. Furthermore, with the liquid crystal display device of Embodiment 1, a configuration is such that a black matrix corresponding to the marginal portions of individual pixels, and R (red), G (green), and B (blue) color filters, are formed on the unshown second substrate SUB2, and the black matrix prevents a leakage of light from between adjacently disposed pixels.

As shown in FIG. 2, the liquid crystal display device of Embodiment 1 has the drain lines DL extended in the Y direction and arranged in parallel in the X direction, and one drain line DL is connected to two pixel columns adjacent to the same pixel row (scan line). Also, it has the gate lines GL extended in the X direction and arranged in parallel in the Y direction, and two gate lines GL1 and GL2 formed adjacent to each other are disposed in the same pixel row.

Also, in Embodiment 1, a configuration is such that two pixels PXL1 and PXL2 are arranged in parallel in the X direction on the upper level, which is an odd-numbered level, while two pixels PXL3 and PXL4 are arranged in parallel in the X direction on the lower level, which is an even-numbered level, and pixel groups each formed of the four pixels PXL1 to PXL4 are disposed in a matrix form within the display region AR, thus carrying out an image display. At this time, the pixels PXL3 and PXL4 on the lower level are formed displaced by half a pitch (half a pixel width in the X direction) in the X direction with respect to the pixels PXL1 and PXL2 on the upper level, and the pixels PXL1 to PXL4 are arranged so that the direction of the displacement varies alternately (for example, from side to side) each time the level descends. However, a configuration may be such that the pixels PXL1 to PXL4 are linearly disposed in the Y direction without having this kind of displacement in the X direction.

In this kind of pixel disposition, two gate lines GL1 and GL2 disposed in each pixel column are formed in a boundary region in which the angle of inclination of slits SLT formed in the pixel electrode PX in which each pixel PXL1 to PXL4 are disposed changes. Consequently, a configuration is such that the gate lines GL1 and GL2 are not formed between pixels adjacent to each other in the Y direction. At this time, two pixels disposed in the same pixel column and connected to the same drain line DL are connected one to each of two differing gate lines GL1 and GL2. For example, the pixel PXL1 connected to the same drain line DL shown on the upper level is connected to the gate line GL1, and the pixel PXL2 is connected to the gate line GL2. In the same way, the pixel PXL3 connected to the same drain line DL shown on the lower level is connected to the gate line GL2, and the pixel PXL4 is connected to the gate line GL1.

Also, the drain line DL extended in the Y direction, after being disposed along one edge side (the left edge side seen in the drawing) of a longer direction marginal portion of the pixel PXL1 and extended in the Y direction (the downward direction seen in the drawing), is disposed along a shorter direction marginal portion of the PXL1 on the lower side seen in the drawing, that is, a marginal portion across which the pixel PXL1 and pixel PXL3 are adjacent to each other, and extended in the X direction (the right direction seen in the drawing). Subsequently, the drain line DL extended in the X direction is divided into two at a point at which the pixel PXL3 and pixel PXL4 are adjacent to each other. One divided drain line DL is disposed along one edge side (the right edge side seen in the drawing) of a longer direction marginal portion of the pixel PXL3, that is, a marginal portion across which the pixel PXL3 and pixel PXL4 are adjacent to each other, and extended in the Y direction (the downward direction seen in the drawing). The other drain line is disposed along a shorter direction marginal portion of the pixel PXL1, that is, a marginal portion across which the pixel PXL1 and pixel PXL4, and further extended in the X direction (the right direction seen in the drawing). A configuration is such that the other drain line DL extended in the X direction, at a shorter direction end portion of the pixel PXL1, is disposed along the other longer direction edge side (right edge side seen in the drawing) marginal portion of the pixel PXL1, that is, a marginal portion across which the pixel PXL1 and pixel PXL2 are adjacent to each other, and extended in the Y direction (the upward direction seen in the drawing), thus reaching the drain electrode DT of a thin film transistor TFT2 (to be described in detail hereafter) forming the pixel PXL2.

Also, the one drain line extended in the Y direction along the longer direction marginal portion of the pixel PXL3, at a longer direction end portion of the pixel PXL3, is disposed along the other shorter direction edge side (lower edge side seen in the drawing) marginal portion of the pixel PXL 3 and extended in the X direction (the left direction seen in the drawing). Subsequently, a configuration is such that the one drain line, at a shorter direction end portion of the pixel PXL3, is extended in the Y direction (the upward direction seen in the drawing) along one longer direction edge side (left edge side seen in the drawing) marginal portion of the pixel PXL3, thus reaching the drain electrode DT of a thin film transistor TFT2 forming the pixel PXL3.

As is clear from FIG. 2, the configuration of each pixel PXL1 to PXL4 of Embodiment 1 has a positional relationship in which the disposition of other components excluding the drain lines DL is inverted in the Y direction (in an up-down direction). Consequently, in the following description, the pixel PXL1 will be described in detail.

As previously described, in each pixel PXL1 to PXL4 in which the gate lines GL1 and GL2 and drain line DL are formed, as well as two gate lines GL1 and GL2 being disposed in a central region of the pixel region in the Y direction, thin film transistors TFT1 and TFT2 corresponding to individual pixels are formed in the central region.

For example, in the pixel PXL1, a configuration is such that the drain line DL protrudes from the gate line GL1 to the lower side seen in the drawing, on the left side seen in the drawing which is a side in the central region of the pixel PXL1 on which the drain line DL is formed, and functions as a gate electrode GT of the thin film transistor TFT1. An insulating film GI to be described hereafter (refer to FIG. 3) is formed covering the gate lines GL too, on the surface of the first substrate SUB1, and functions as a gate insulating film in a region in which each thin film transistor TFT1 and TFT2 is formed. An island-like semiconductor layer AS made of, for example, amorphous silicon is formed in a portion superimposed over the gate electrode GT on the insulating film GI. The semiconductor layer AS is one forming the semiconductor layer of the thin film transistor TFT1, and the drain electrode DT and a source electrode ST, which are opposed to each other, are formed on the top of the semiconductor layer, thereby forming the thin film transistor TFT1 with a so-called metal insulator semiconductor (MIS) structure.

The drain electrode DT, having a semicircular curved form, is formed simultaneously with the formation of the drain line DL, and the drain line DL and drain electrode DT are electrically connected by an extension portion JC formed by one portion of the drain line DL being extended. Also, the source electrode ST is formed simultaneously with the formation of the drain electrode DT, and a pad portion PD extended from the source electrode ST is also formed at the same time. In this way, in Embodiment 1, the drain electrode DT forms a semicircular curved pattern, and the source electrode ST is disposed opposed to a concave surface of the drain electrode DT. Because of this, the channel width of the thin film transistor TFT1 can be configured to be large.

A configuration is such that, as the upper layer of the pad portion PD, a protective film PAS also covering the thin film transistor TFT1, drain line DL, and the like, is formed on the surface of the first substrate SUB1, as shown in FIG. 3, thus flattening the surface of the protective film PAS. The planar common electrode CT is formed on the top of the protective film PAS. The common electrode CT is configured by a translucent conductive film made of, for example, indium tin oxide (ITO), but a ZnO (zinc oxide) series transparent conductive film may be used.

In the liquid crystal display device of Embodiment 1, the common electrode CT is configured to be formed independently for each pixel, and in particular, is not formed in the central region of the pixel PXL1 in which, as well as the thin film transistor TFT1 being formed, the gate lines GL1 and GL2 are formed. That is, the common electrode of Embodiment 1 is configured to be formed in only the upper side region and lower side region of a central region of the pixel PXL1, which is a region in which the slits SLT are formed in the pixel electrode PX formed within the region in which the pixel PXL1 is formed. The common electrode CT may be formed so as to cross the central region by reducing a size of the pad portion PD in the X direction.

Two insulating films IN1 and IN2 are formed as the upper layer of the common electrode CT so as to cover the surface of the first substrate, and the pixel electrode PX is formed on the top of the insulating films IN1 and IN2 for each of the regions of the pixels PXL1 to PXL4. In the same way as the common electrode, the pixel electrode PX is also configured by a translucent conductive film made of, for example, ITO. The pixel electrode PX of Embodiment 1 is such that a plurality of linear (comb-like) electrodes are formed in a region superimposed over the common electrode CT by forming a plurality of the slits SLT, which are opening portions in a planarly formed transparent electrode in the region superimposed over the common electrode CT.

At this time, as shown in FIG. 4, the pixel electrode PX of Embodiment 1 is configured so that no slit SLT is formed in the central region of the pixel PXL1, and within the region in which no slit is formed, the pixel electrode PX is connected to the pad portion PD through a contact hole TH formed in the insulating films IN1 and IN2 and protective film PAS. Because of this, the pixel electrode PX is electrically connected to the source electrode ST of the thin film transistor TFT.

Also, the pixel electrode PX of Embodiment 1, as is clear from FIG. 4, has a so-called vertical multi-domain electrode configuration wherein the slits SLT formed on the upper side region seen in the drawing are configured to be inclined in a plus direction from the Y direction, while the slits SLT formed on the lower side region seen in the drawing are configured to be inclined in a minus direction from the Y direction. Consequently, even in the case of the pixel electrodes of the pixels PXL1 and PXL2 connected to the same drain line DL and adjacently disposed in the same pixel row, it is possible to increase a gap L between the pixel electrodes, meaning that it is possible to prevent a deterioration in display quality caused by a push domain, thus improving the aperture ratio of pixels and significantly reducing the effect of a diving voltage from an adjacent pixel.

As heretofore described, the liquid crystal display device of Embodiment 1 has the following configuration. That is, as well as one drain line DL being disposed for every two pixels adjacent to each other within the same pixel row, the gate lines GL are formed of the gate line GL1 connected to one of the pixels connected to the same drain line within the same pixel row, and the gate line GL2 connected to the other pixel. In the region in which the pixel electrode PX formed for each pixel region is superimposed over the common electrode CT, the linear electrode is formed in the upper side region in FIG. 2 by the slits SLT inclined in the plus direction from the Y direction, which is the extension direction of the drain line, and the linear electrode is formed in the lower side region in FIG. 2 by the slits SLT inclined in the minus direction from the extension direction of the drain line. Two gate lines GL1 and GL2 and thin film transistor TFT are formed, for each pixel, in the region between the region in which is formed the linear electrode inclined in the plus direction and the region in which is formed the linear electrode inclined in the minus direction. Because of this configuration, it is possible to prevent a deterioration in display quality caused by a push domain, thus improving the aperture ratio of pixels and significantly reducing the effect of a diving voltage from an adjacent pixel.

[Embodiment 2]

Figure 5:
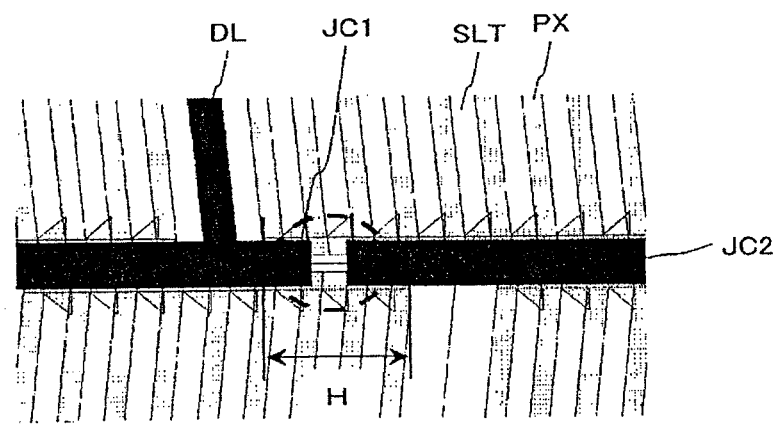
FIG. 5 is an enlarged view for illustrating an outline configuration of a drain line in a liquid crystal display device of Embodiment 2 of the invention.
Figure 6:
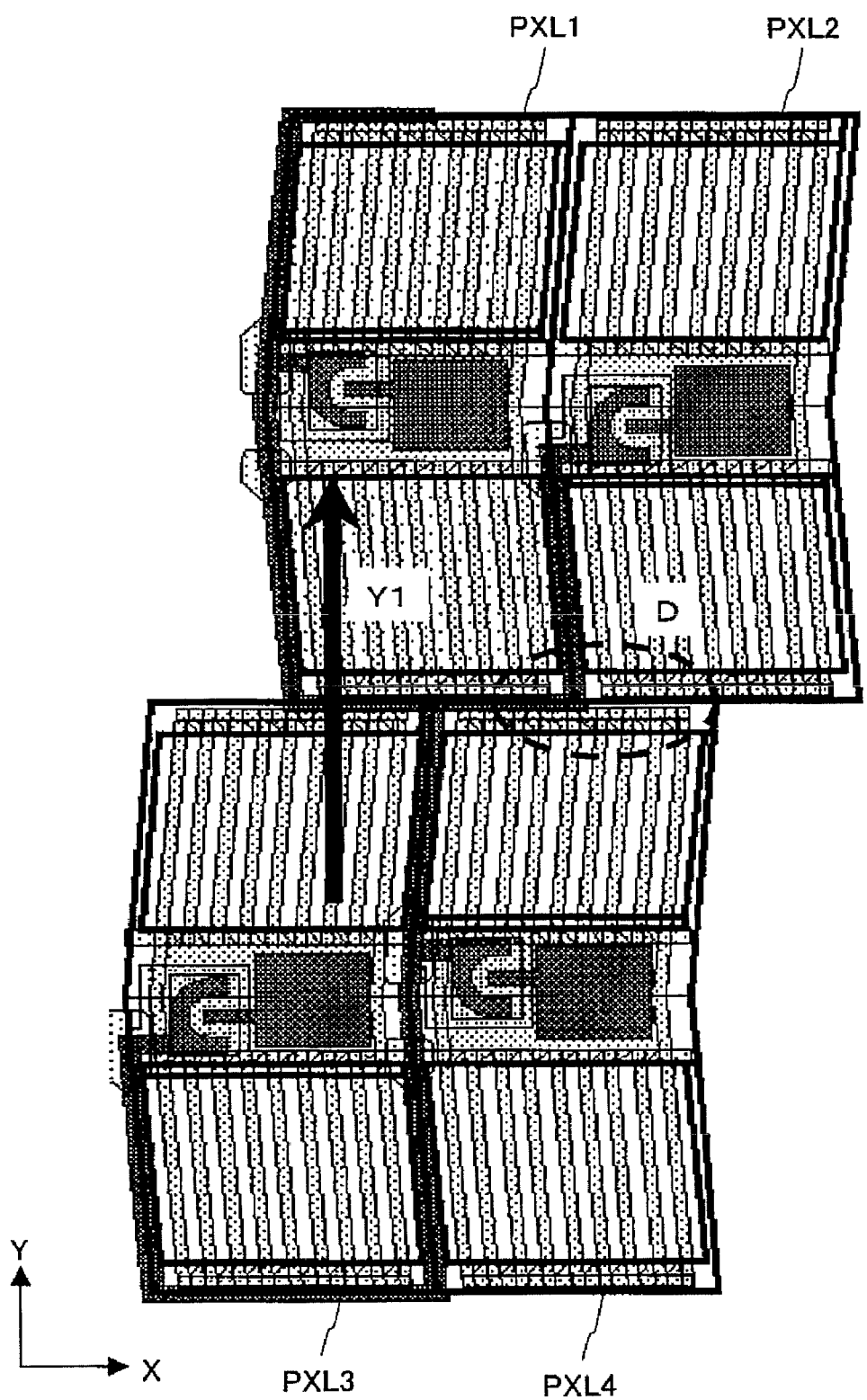
FIG. 6 is a diagram for illustrating a drain line formation region in the liquid crystal display device of Embodiment 2 of the invention.
Figure 7:
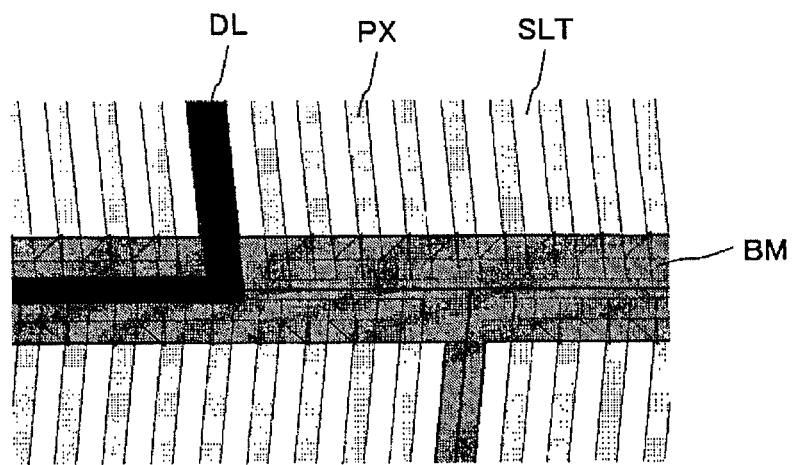
FIG. 7 is an enlarged view for illustrating a drain line of Embodiment 1 in the region shown in FIG. 6.
Figure 8:
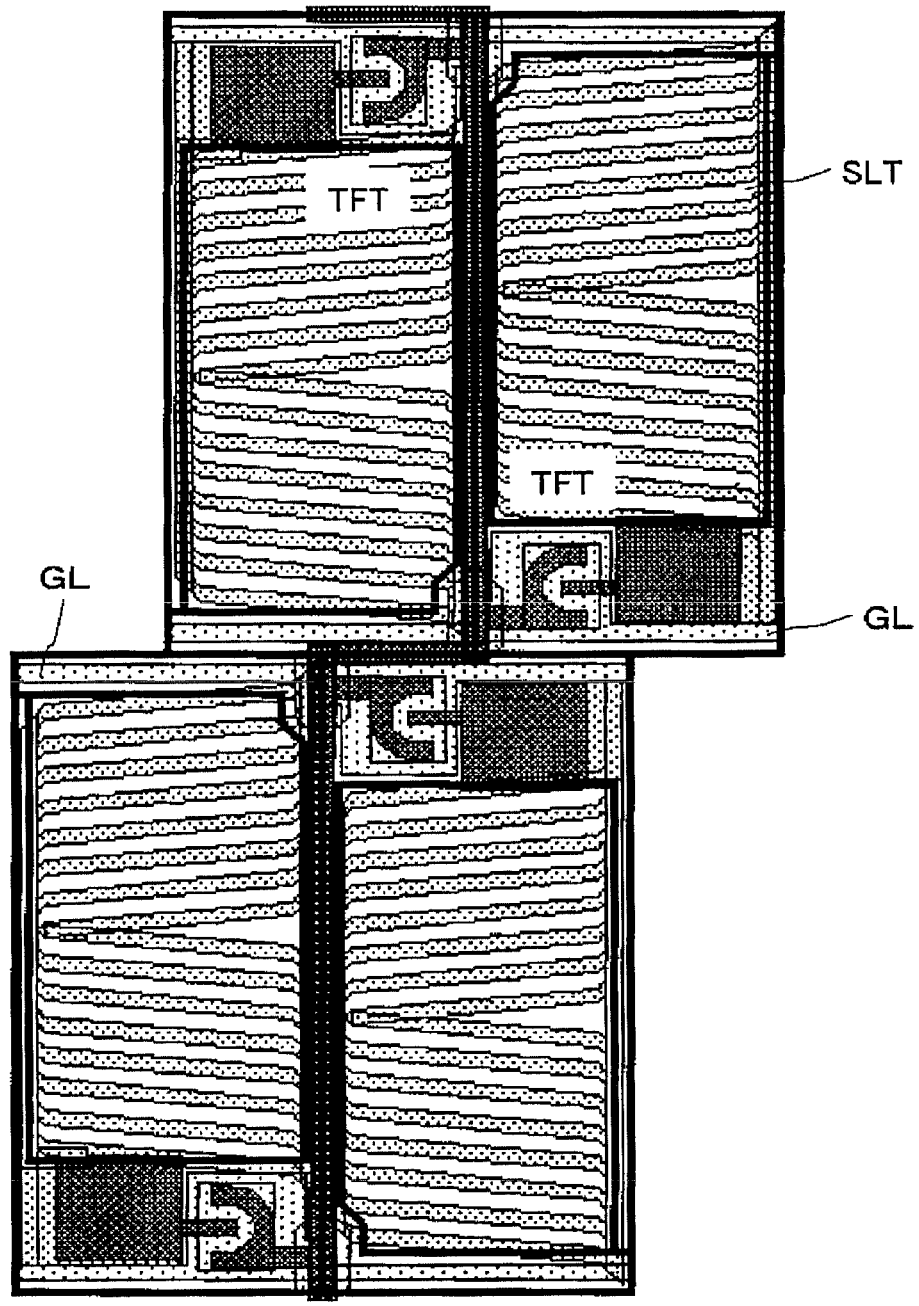
FIG. 8 is a diagram for illustrating a pixel configuration in a heretofore known liquid crystal display device.
Figure 9:
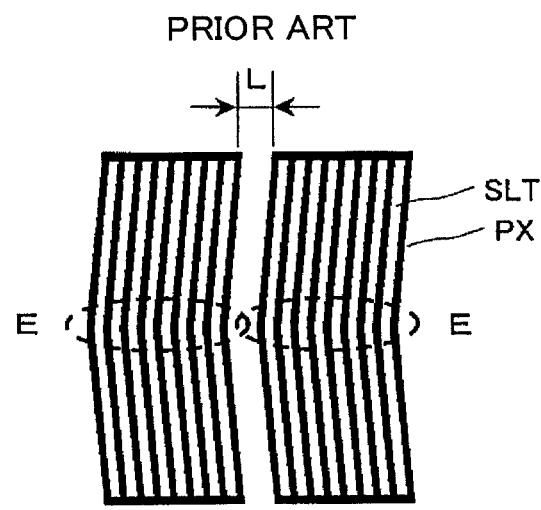
FIG. 9 is a diagram for illustrating a pixel configuration in a heretofore known liquid crystal display device.
Figure 10:
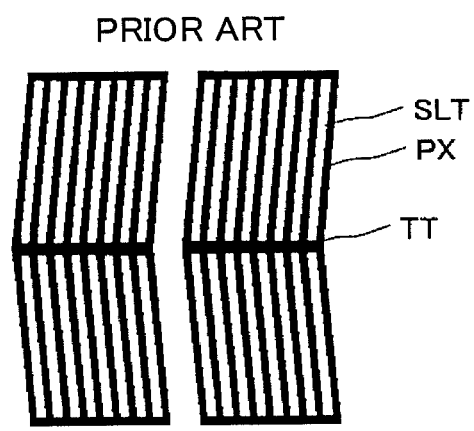
FIG. 10 is a diagram for illustrating a pixel configuration in a heretofore known liquid crystal display device.

FIG. 5 is an enlarged view for illustrating an outline configuration of a drain line in a liquid crystal display device of Embodiment 2 of the invention, showing a case in which the invention is applied to the liquid crystal display device of Embodiment 1. Also, FIG. 6 is a diagram for illustrating a drain line formation region in the liquid crystal display device of Embodiment 2 of the invention, and FIG. 7 is an enlarged view for illustrating the drain line of Embodiment 1 in the region shown in FIG. 6. However, an arrow Y1 shown in the drawing indicates a rubbing direction of an unshown oriented film, that is, an initial orientation direction of liquid crystal molecules. In the liquid crystal display device of Embodiment 2, other components excluding extension portions JC1 and JC2 extended from the drain line and formed between the pixel PXL2 and pixel PXL4, and a black matrix formed on an unshown second substrate SUB2, are the same as those of the liquid crystal display device of Embodiment 1. Consequently, in the following description, the extension portions JC1 and JC2 and black matrix will be described in detail.

The drain line of Embodiment 2 is formed in the region shown by a circle D in FIG. 6, and configured to prevent a leakage of light between pixels disposed adjacent to each other in the Y direction. At this time, the drain line DL of Embodiment 2, as shown in FIG. 5, is formed so that the wiring width of a portion thereof extended in the X direction is large, and is formed so that a Y direction end portion of the pixel electrode and the drain line DL are superimposed on each other. Furthermore, the drain line DL of Embodiment 2 has the extension portion JC1 extended also to the region in which the X direction drain line is not formed in Embodiment 1, and is thus configured to prevent a leakage of light between pixels disposed adjacent to each other in the Y direction together with the extension portion JC2 extended from an unshown adjacent drain line.

At this time, as is clear from FIG. 5, the extension portion JC1 extended in the X direction (the right direction seen in the drawing) from the drain line DL is disposed in the region, shown by the circle D in FIG. 6, in which the pixel PXL2 and pixel PXL4 are adjacent to each other. Also, the extension portion JC2 extended in the X direction (the left direction seen in the drawing) from a next drain line adjacent to the drain line DL, that is, the unshown drain line formed along the right side marginal portion of the pixel PXL2 seen in the drawing is disposed in this region. At this time, as shown in the dotted-line circle in FIG. 5, the extension portion JC1 and extension portion JC2 are disposed opposed to each other in the X direction with a predetermined gap. Also, in Embodiment 2, the opposed side end portions of the extension portion JC1 and extension JC2 are formed in a region with a width of H between the left lower side end portion of the pixel electrode PX of the pixel PXL2 and the upper right end portion of the pixel electrode PX of the pixel PXL4. By adopting this kind of configuration, it is possible to prevent a short circuit between adjacent drain lines accompanying a short circuit between the extension portion JC1 and extension portion JC2, and allow the oriented film rubbing direction and electric field direction and a direction of the polarizing axis of an unshown polarizing plate to coincide with each other, and it is possible to prevent a leakage of light during a liquid crystal display operation in a portion in which the extension portion JC1 and extension portion JC2 are separated from one another. However, the distance (gap) between the end portion of the extension portion JC1 and the end portion of the extension portion JC2 is appropriately set depending on a liquid crystal material, a drive voltage, or the like.

At this time, as shown in FIG. 7, when a black matrix BM is formed on the second substrate, blocking regions adjacent to each other in the Y direction from light, it is necessary to increase the width of the black matrix BM, taking into account the accuracy of formation of the black matrix BM, the accuracy of alignment of the first substrate SUB1 and second substrate SUB2, and the like. In response to this, with the liquid crystal display device of Embodiment 2, as it is possible to form the extension portions JC1 and JC2 with the accuracy with which a thin film layer is formed on the first substrate SUB1, it is possible to form the wiring width of the extension portions JC1 and JC2 so as to be smaller than the width of the black matrix BM. Consequently, in addition to the advantages of Embodiment 1, it is possible to obtain an extra advantage in that it is possible to significantly improve the aperture ratio.

Heretofore, a specific description has been given, based on the heretofore described embodiments of the invention, of the invention contrived by the inventor, but the invention, not being limited to the heretofore described embodiments, can be variously changed without departing from the scope thereof.

What is claimed is:

1. A liquid crystal display device comprising:
   drain lines extended in a first direction and arranged in parallel in a second direction different from the first direction;
   gate lines extended in the second direction and arranged in parallel in the first direction;
   a common electrode, formed to be planar, into which a common signal which is a reference is input;
   a pixel electrode disposed on a liquid crystal layer side across a first insulating film and disposed superimposed over the common electrode; and
   a thin film transistor which supplies a video signal from the drain lines to the pixel electrode in synchronism with a scan signal from the gate lines, wherein
   the pixel electrode is formed of a first linear electrode inclined in a plus direction to form a first angle to the first direction, and a second linear electrode inclined in a minus direction to form a second angle to the first direction, in a region in which the pixel electrode is superimposed over the common electrode, and
   a first extension portion is extended from the drain line in the second direction and formed between adjacent pixels,
   a second extension portion different from the first extension portion is extended from the drain line in the second direction and formed between adjacent pixels, and
   the first extension portion and the second extension portion are disposed opposed to each other in the second direction with a gap,
   a width of the first extension portion in the first direction and a width of the second extension portion in the first direction are larger than a width of the drain line in the second direction.

2. The liquid crystal display device according to claim 1, wherein
   the width of the first and second extension portion in the first direction is smaller than a width of a black matrix in the first direction.

3. The liquid crystal display device according to claim 1, wherein
   the pixel electrode is such that, in the upper layer of the first insulating film, the region of the first linear electrode and the region of the second linear electrode are disposed opposed to each other in the first direction.

4. The liquid crystal display device according to claim 3, wherein
   a second insulating film is superimposed over the first insulating film and the pixel electrode is superimposed over the second insulating film.

5. The liquid crystal display device according to claim 1, wherein
   the drain lines have at least two different inclination angles in the first direction.

* * * * *